June 14, 1960
J. F. WHITMORE
2,940,486
PRUNING APPARATUS
Filed Aug. 19, 1957
3 Sheets-Sheet 1
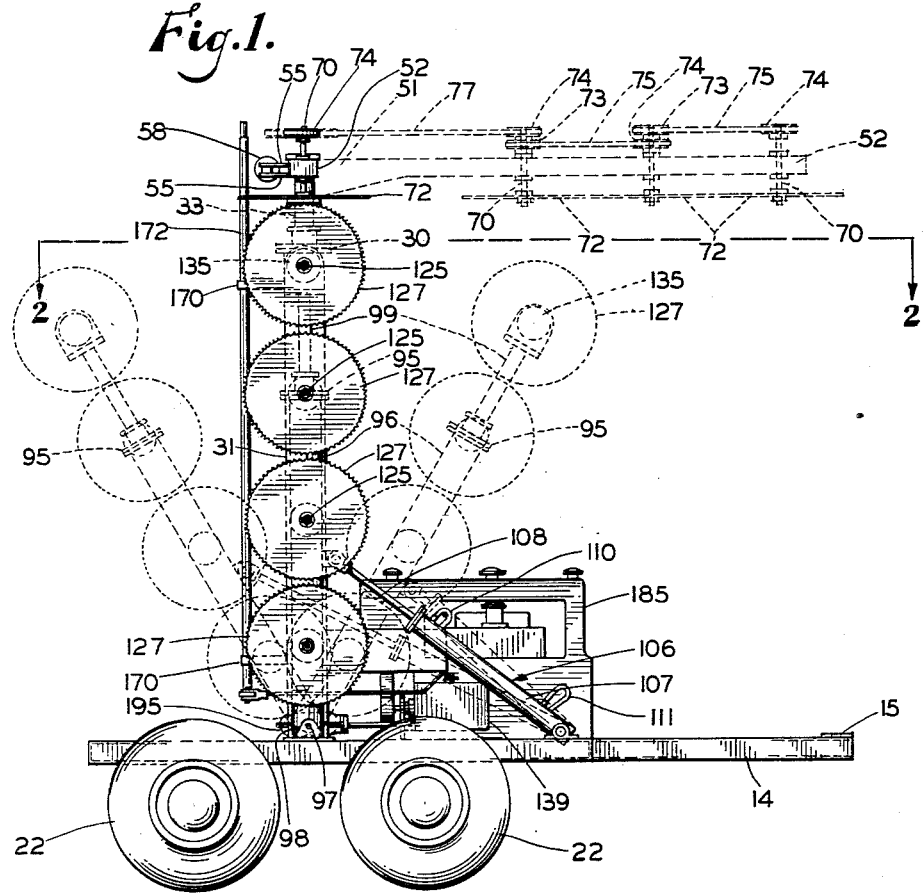
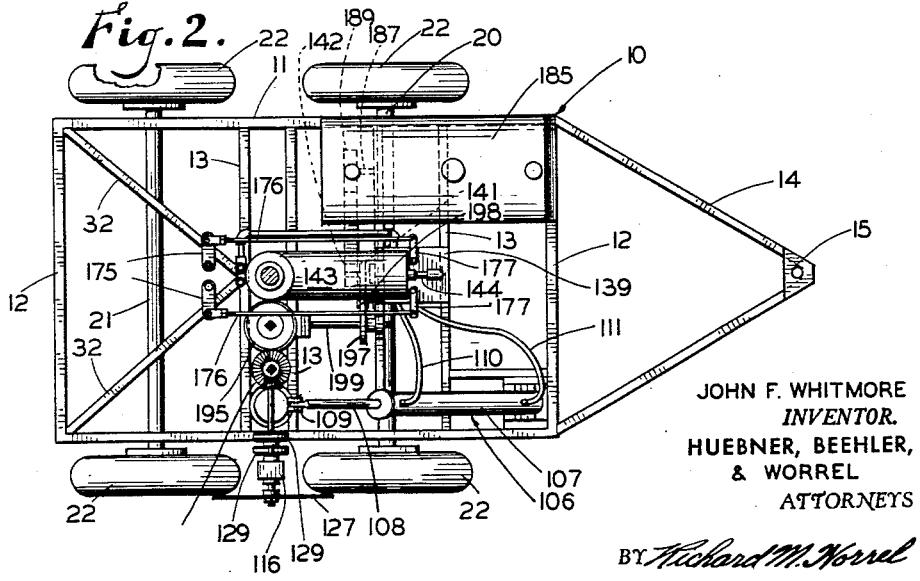
JOHN F. WHITMORE
INVENTOR.
HUEBNER, BEEHLER,
& WORREL
ATTORNEYS June 14, 1960  J. F. WHITMORE  2,940,486
PRUNING APPARATUS
Filed Aug. 19, 1957  3 Sheets-Sheet 2

JOHN F. WHITMORE
INVENTOR.
HUEBNER, BEEHLER,
& WORREL
ATTORNEYS
BY Richard M. Worrel

JOHN F. WHITMORE
INVENTOR.
HUEBNER, BEEHLER,
& WORREL
ATTORNEYS

United States Patent Office 2,940,486
Patented June 14, 1960

2,940,486

PRUNING APPARATUS

John F. Whitmore, Visalia, Calif., assignor of one-half to Richard Co., Woodlake, Calif., a partnership Filed Aug. 19, 1957, Ser. No. 678,863

9 Claims. (Cl. 143—43)

The present invention relates to a pruning apparatus and more particularly to a mechanically operated pruning apparatus especially adapted for the mass or group pruning of trees, shrubs and the like.

Most fruit trees require pruning each year during their dormant period. Although citrus and olive trees require some pruning, deciduous fruit trees must be rather heavily pruned or the yield is impaired, the fruit size smaller, and the sale price reduced. In the past, pruning has been principally performed by using manually operated pruning shears augmented when needed by saws. When performed manually, pruning has involved the removal of certain limbs on a selected basis to reduce the number of buds and to shape the tree. Such selective pruning permits the accommodation and adjustment to individual tree requirements but the pruning cost has usually represented a very high percentage of the cost of production, sometimes even amounting to as much as one-half of such cost.

With deciduous trees, topping represents one of the foremost pruning jobs. This is done to reduce the tree height for more effective spraying, to facilitate picking, to enable more sunshine to reach the inner parts of the tree, and to promote ventilation.

In addition, it has been found that the conventional rounded shape of trees is an impediment during spraying. Modern spraying equipment generally provides nozzles mounted on an oscillating boom which is directed upwardly toward the trees. Quite frequently as the spray equipment travels along a row, the nozzles become entangled with the trees.

It is an object of the present invention to provide a mechanically operated pruning apparatus.

Another object is to reduce the costs of tree crop production.

Another object is to improve the yield, size, health and vigor of fruit trees by more efficient pruning.

Another object is to facilitate spraying and picking of fruit trees.

Another object is to prune trees in such a manner that the trees receive beneficial sunlight more easily and ventilating air currents can pass through the trees more thoroughly.

Another object is to reduce the time and labor required for pruning a tree.

Another object is to provide an automatic apparatus for pruning the side and top of a tree simultaneously.

Another object is to provide a pruning apparatus which can be accommodated to the pruning load encountered.

These together with other objects will become more fully apparent upon the reference to the following description.

In the drawings:

Fig. 1 is a side elevation of the pruning apparatus embodying the principles of the present invention showing alternate positions of vertical and horizontal saws employed in dashed lines.

Fig. 2 is a horizontal section taken on line 2—2 of Fig. 1.

Figure 3:
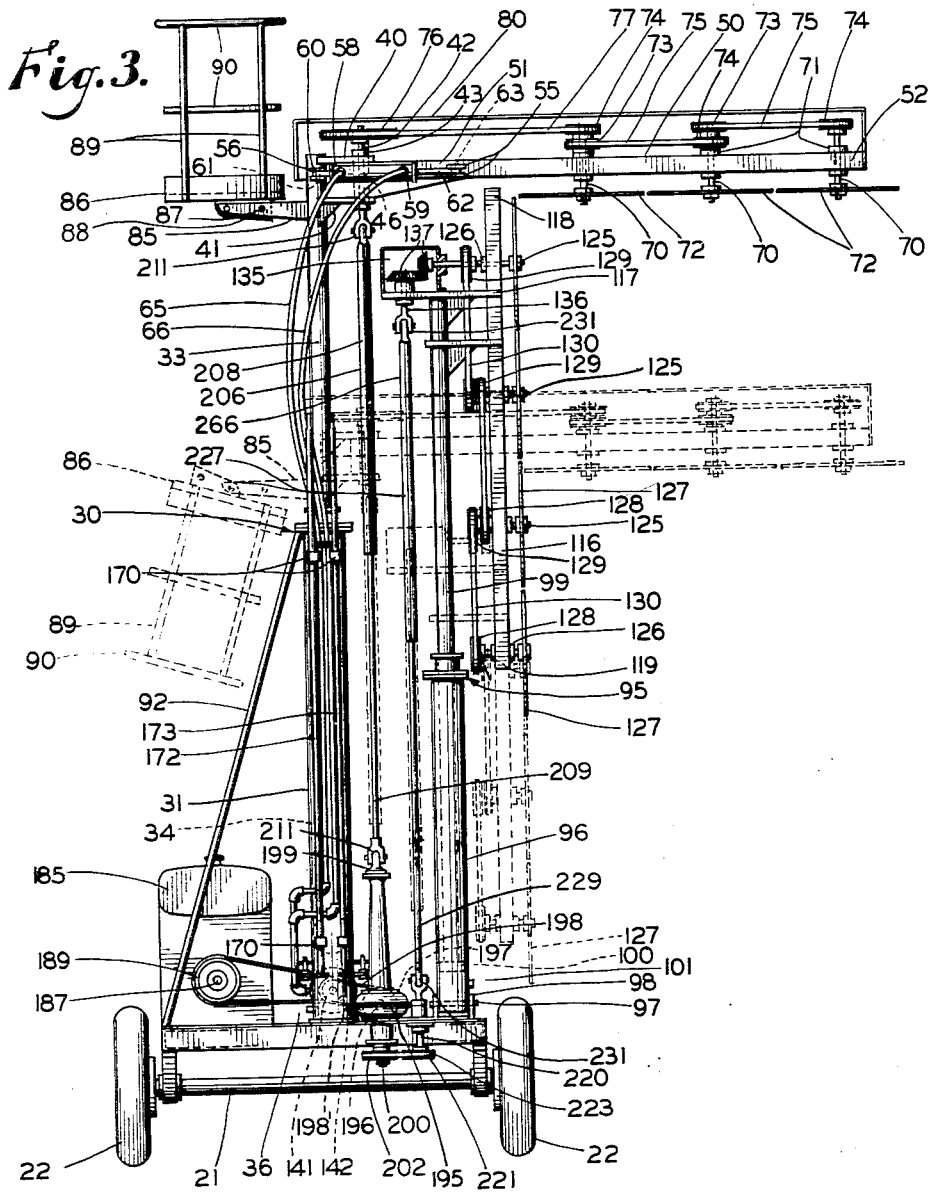
Fig. 3 is a rear elevation of the pruning apparatus showing the horizontal saws in an upper position in full lines and a lower position in dashed lines.

Referring more particularly to the drawings, a substantially horizontal support frame 10 is provided and includes spaced, parallel longitudinal side frame members 11 and transverse, spaced, parallel, front and rear frame members 12 connected to the longitudinal members in rectangular relation. The frame also provides a plurality of intermediate frame members 13 interconnecting the longitudinal frame members, and a pair of forwardly convergent draft members 14 terminating in a coupling hitch 15.

A substantially horizontal axle 20 is connected transversely beneath the frame 10, and a horizontal rear axle 21 likewise is connected beneath the frame rearwardly of the front axle. Ground engaging wheels 22 are rotatably journaled on opposite ends of the front and rear axles and support the frame for earth traversing movement along a predetermined line of travel parallel with the planes of the wheels. The wheels may be mounted to rise and fall independently relative to the frame so as to maintain the frame in substantially horizontal position at all times, if desired.

A substantially vertical, cylindrical mast 30 provides a lower portion 31 rigidly mounted centrally of the frame 10 and upwardly extended therefrom. The lower portion of the mast is an hydraulic cylinder. Elongated braces 32 are extended from rear corners of the frame convergently upwardly and are connected at an upper end of the lower portion of the mast for support thereof. The mast also includes an elevationally adjustable upper portion 33 mounted in the lower portion for longitudinal reciprocal slidable movement between upper and lower positions, as indicated in Fig. 3. The upper portion is a piston rod for the hydraulic cylinder of the lower portion, and a piston 34 is secured to the upper portion for slidable movement in the lower portion of the mast. A fluid conduit 36 is connected to said lower portion for delivering and releasing fluid to and from the lower portion thereby to raise and to lower the upper portion.

A pair of vertically spaced substantially horizontal hinge plates 40 are laterally extended from an upper end of the upper portion 33 of the mast 30, and gussets 41 extend between the mast and the hinge plates for additional support thereof. A substantially vertical connecting pin 42 is mounted in bearings 43 fitted in the hinge plates for rotation about a vertical, longitudinal axis. The connecting pin provides upwardly and downwardly extended ends. A vertically disposed bushing 46 is also mounted between the hinge plates in concentric circumscribing relation to the connecting pin.

A substantially horizontal elongated saw beam 50 includes an inner end 51 journaled for rotation on the bushing 46 and an outer end 52 laterally outwardly extended from the mast 30. It will be evident that the horizontal saw beam is thus mounted on the mast for swinging movement in a horizontal plane around the vertical axis defined by the connecting pin or the bushing.

Spaced, vertical beam lugs 55 are outwardly extended from the saw beam 50, and similarly, spaced parallel mast lugs 56 are outwardly extended from the upper portion 33 of the mast 30 in the same plane as the beam lugs. An hydraulic beam control ram 58 includes an hydraulic cylinder 59 having an ear 60 pivotally connected between the mast lugs by a pin 61. The ram also has a piston rod 62 reciprocal in the cylinder and releasably pivotally connected between the beam lugs by a pin 63. Fluid conduits 65 and 66 are connected to opposite ends of the cylinder for extending and contracting the piston rod 62.

A plurality of vertical saw shafts 70 are journaled for rotation in bearings 71 mounted in the saw beam 50. The saw shafts are in longitudinally spaced relation and lie along a common straight line longitudinally of the beam. A plurality of substantially circular horizontal saws 72 of uniform diameter are mounted on lower ends of the saw shafts which extend downwardly below the beam. The horizontal saws thus have centers of rotation located along a substantially straight line. They are also located in a substantially common horizontal plane. From reference to Figs. 1, 3 and 4 it will be evident that the peripheries of adjacent saws are in adjacent, closely spaced relation. The saws of course have peripheral cutting teeth. Although not limiting, it has been found in practice that the horizontal saws are preferably approximately twenty-four inches in diameter. The innermost and the intermediate saw shafts are provided with drive sheaves 73 whereas all of the shafts are provided with driven sheaves 74. Pulley belts 75 interconnect a drive sheave on one shaft with a driven sheave on an adjacent shaft, as will be evident. A master drive sheave 76 is mounted on the upwardly extended end of the connecting pin 42 for rotation therewith, and a master pulley belt 77 interconnects this sheave with the driven sheave on the innermost saw shaft. A shield 80 is mounted on the horizontal saw beam 50 and encloses the upwardly extended ends of the saw shafts, the connecting pin 42, and the sheaves.

A bracket 85 is extended outwardly from an upper end of the upper portion 33 of the mast 30, and a substantially circular platform 86 is mounted on the bracket by arms 87 for pivotal movement between a substantially horizontal position, as shown in Fig. 3 in full lines, and a downwardly extended position, as shown in Fig. 3 in dashed lines. The bracket and arms have apertures which register when the platform is horizontal and a latch pin 88 is releasably slidably extended through the apertures for holding the platform in horizontal position. Posts 89 are upwardly extended from the platform, when considered in its horizontal position, and guard hoops 90 encircle and are connected to the posts. A ladder 92 is extended from the frame 10 upwardly and has an upper end connected to the upper end of the lower portion 31 of the mast.

An upright, elongated boom 95 includes a lower portion 96 mounted on the frame 10 adjacent to one of the longitudinal slide frame members 11. Specifically, the lower portion of the boom is mounted for forward and rearward pivotal or tilting movement on a horizontal pivot pin 97 supported in a bracket 98 secured to the frame. The boom thus pivots around a substantially horizontal axis defined by the pivot pin. Further, the lower portion of the boom is an hydraulic cylinder and in this respect is similar to the lower portion 31 of the mast 30. The vertical boom also has an upper portion 99, serving as a piston rod, and being elevationally reciprocal in the lower portion 96. A piston 100 is connected to the upper portion and is longitudinally slidable in the lower portion of the boom. A fluid conduit 101 is connected to the lower portion of the boom for admitting and releasing fluid to and from the lower portion thereby to raise and lower the upper portion.

An hydraulic tilt control ram 106 includes a cylinder 107 providing a lower end pivotally connected to the frame 10 adjacent to its forward end, and a piston rod 108 reciprocal in the cylinder and pivotally connected at 109 to the lower portion 96 of the boom 95. Fluid conduits 110 and 111 are connected to opposite ends of the cylinder 107 for extending and contracting the piston rod 108 whereby the boom can be forwardly and rearwardly tilted or positioned in a precisely vertical manner in the same transverse plane as the mast 30, all as indicated in Fig. 1.

An upright saw bar 116 is mounted on a horizontal plate 117 connected to the upper end of the upper portion 99 of the boom 95. The saw bar thus has an upwardly disposed end 118 and a downwardly extended end 119. It is to be understood that the saw bar is rigidly connected to the upper portion of the boom so as to be elevationally adjustable therewith and also forwardly and rearwardly tiltable with the boom. Preferably, the saw bar is in spaced parallel relation with the boom.

A plurality of horizontal saw shafts 125 are journaled in bearings 126 mounted in the saw bar 116 in spaced relation longitudinally of the beam along a straight line, similarly to the vertical saw shafts 70. A plurality of substantially circular vertical saws 127 of uniform diameter are secured to the ends of the shafts extended outwardly from the saw beam and are located in a substantially common vertical plane, as best seen by reference to Fig. 3. The saws have cutting teeth along their peripheries, and the peripheries of adjacent saws are in adjacent closely spaced relation. Although not limiting, vertical saws of approximately thirteen inch diameters are found to suit the purpose excellently. It is to be noted that the vertical saw diameter is about one-half the horizontal blade diameter. All of the shafts 125 have driven sheaves 128 connected to their inwardly extended ends, and the uppermost and intermediate shafts have drive sheaves 129. Pulley belts 130 interconnect the drive and driven sheaves of adjacent shafts.

A gear box 135 mounted on the plate 117 and provides a vertical input shaft 136. The uppermost horizontal saw shaft 125 is connected to the gear box and constitutes an output shaft thereof having connection to the input shaft 136 through appropriate bevel gears 137 connected to the respective shafts.

Figure 5:
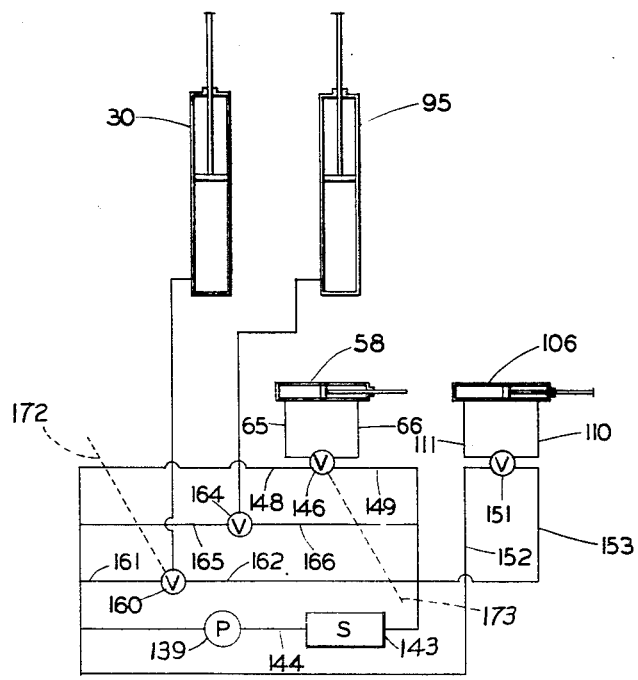
Fig. 5 is a diagrammatic sketch of an hydraulic system employed with the subject invention.

With particular reference to Figs. 2 and 5, an hydraulic pump 139 is mounted on the frame 10 forwardly of the mast 30 and provides a rearwardly extended driven shaft 140. A drive pulley 141 and a driven pulley 142 are secured to the driven shaft in adjacent longitudinally spaced relation. A sump or reservoir 143 is also mounted on the frame adjacent to the pump, and a fluid conduit 144 interconnects the pump and the sump.

The hydraulic system, best seen in Fig. 5, further includes a saw beam control valve 146 having connection to the beam control ram 58 by means of conduits 65 and 66 and to the pump 139 and the sump 143 by fluid conduits 148 and 149, respectively. The beam control valve has an extend position connecting the pump to conduit 65 and the sump to conduit 66 to swing the saw beam 50 forwardly and a retract position connecting the pump to conduit 66 and the sump to conduit 65 to swing the beam rearwardly.

A tilt control valve 151 is also employed having connection to the tilt control ram 106 by means of conduits 110 and 111. Conduits 152 and 153 connect the valve 151 to the pump 139 and to the sump 143, respectively, so that in an extend position of the valve, the pump is connected to conduit 111 and the sump to conduit 110 to tilt the boom rearwardly and in a retract position of the valve, the connections are reversed to tilt the boom forwardly.

Further, a mast control valve 160 is connected to the lower portion 31 of the mast 30 by conduit 36 and to the pump 139 and the sump 143 by conduits 161 and 162. The mast control valve has two positions; in one, the pump connects to the conduit 36 to elevate the mast and in the other, the conduit 36 connects to the sump to bleed fluid back to the sump under weight of the mast whereby the mast is lowered.

Still further, a boom control valve 164 is connected to the lower portion 96 of the boom 95 by conduit 101 and to the pump 139 and the sump 143 by means of conduits 165 and 166, respectively. In one position the valve 164 connects the conduit 165 and the conduit 101 to raise the boom and in a second position, the conduit 101 is connected to the sump to allow weight of the boom to bleed fluid back to the sump whereby the boom is lowered.

Figure 4:
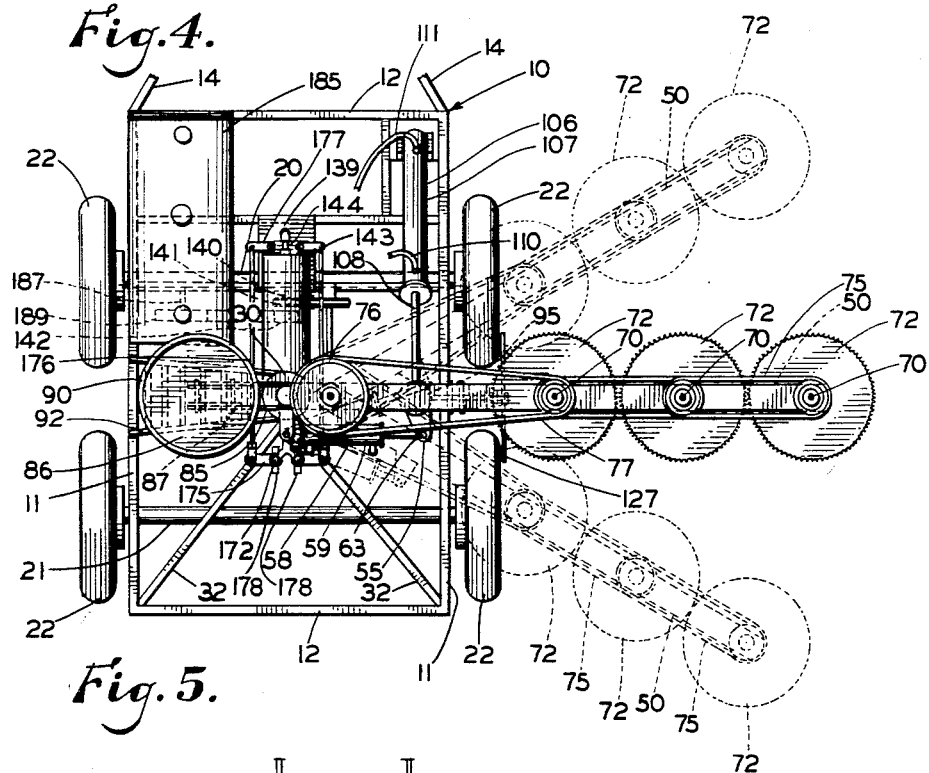
Fig. 4 is a top plan view of the pruning apparatus showing the horizontal saw boom in a pruning position in full lines and in alternate forwardly and rearwardly extended positions in dashed lines.

With particular reference to Fig. 3, brackets 170 are connected to the lower portion 31 of the mast 30 and rotatably mount a mast control rod 172 and a beam control rod 173 in upright positions alongside of the mast. The control rods have upwardly and downwardly extended ends. Levers 175 are individually rigidly radially extended from the downwardly extended ends of the rods. Elongated links 176 pivotally interconnect the levers and arms 177 individually connected to the mast control valve 160 and to the beam control valve 146. When the rods are rotated in one direction, the valves to which they are respectively connected are moved to one position, as above described, and when rotated in an opposite direction, they are moved to a second position, also described above. Preferably elongated, releasable, telescopic keys 178 and 179, illustrated in Fig. 4, are fitted on the upper ends of the rods 172 and 173 and extended upwardly for manipulation from the platform 86.

An internal combustion engine 185 is mounted on the frame 10 on the opposite side from the boom 95 and provides an output shaft 187 on which is mounted a drive pulley 189. A differential 195 is also mounted on the frame 10, to the right of the mast 30 as viewed in Fig. 3, and provides an input shaft 196 on which is mounted an input pulley 197. A pulley belt 198 is extended around the drive pulley 141 and the input pulley 197, and a belt tightener 198', best seen in Fig. 3, is provided for tightening and loosening the belt. The differential also has a downwardly extended output drive shaft 199 for the horizontal saws 72 and a downwardly extended output drive shaft 200 for the vertical saws 127. A pulley 202 is mounted on the shaft 200.

A telescopic beam connecting rod 206 non-circular in cross section, preferably square, includes a lower section 208 releasably connected to the horizontal saw output shaft 199 by a universal joint 211 and an upper section 209 telescopically slidable in the lower section and connected to the connecting pin 42 by a universal joint 211.

A coupling shaft 220 is mounted in the frame 10 in a vertical position laterally adjacent to the differential 195 and has a lower end, on which is mounted a pulley 221, and an upwardly extended end. A pulley belt 223 is releasably extended around the pulleys 202 and 221.

A telescopic bar connecting rod 226 also non-circular in cross section has a lower section 227 connected to the upwardly extended end of the coupling shaft 220 by a universal joint 231. The rod 226 further includes an upper section telescopically slidable in the lower section and connected by a universal joint 231 to the input shaft 136 of the gear box 135.

*Operation*

The operation of the described embodiment of the subject invention is briefly summarized at this point. The pruning apparatus is used to prune a row of trees in rapid succession but can be used to prune a single tree.

The hitch 15 of the frame 10 is connected to a prime mover, such as a tractor or a truck, not shown, and pulled into position alongside of a row of trees. During movement of the pruning apparatus to and from the pruning site, the pin 63 is removed and the horizontal saw beam 50 swung into a transporting position, as viewed in Fig. 1 in dashed lines, in longitudinal alignment with the line of travel of the frame. Further, during transportation, the latch pin 88 is removed and the platform allowed to drop into downwardly extended position, as viewed in Fig. 3 in dashed lines.

The apparatus is stopped somewhat in advance of a tree for preliminary adjustment. The pin 63 is inserted to connect the beam control ram 58 to the beam 50, and the pin 88 is inserted to place the platform 86 in horizontal position. With pulley belt 198 slack as adjusted by the belt tightener 198', the engine 185 is started. This energizes the pump 139 but does not rotate the saws 72 and 127 since the pulley belt 198 is loose. The boom control valve 164 is adjusted to elevate the boom 95 so that the vertical saws 127 at least extend slightly above and below the upper and lower edges of the tree. The tilt control valve 151 is then adjusted to tilt the boom 95 and the saw bar 116 slightly forwardly.

Next, an operator ascends the ladder 92 and mounts the platform 86. The mast control rod 172 is then rotated by the key 178 to raise the mast 30 so the plane of the horizontal saws 72 is adjusted to the desired pruning plane of the tree 250. The platform, being at the uppermost end of the mast, keeps the operator above the tree tops at all times. Then the beam control rod 173 is rotated by the key 179 to swing the horizontal saw beam 50 into a pruning position extended outwardly in substantially right-angular relation to the line of travel of the frame 10. The frame is initially positioned so that the peripheries of the innermost and the outermost saws 72 extend slightly beyond a side and the middle, respectively, of the trees. In other words, the horizontal saws extend inwardly by at least one-half the width of the tree.

Several features regarding the horizontal and vertical saws 72 and 127, respectively, are to be noted. When the horizontal saws are in the pruning position described in the preceding paragraph, the plane of the vertical saw is spaced slightly inwardly of the periphery of the innermost horizontal saw and is perpendicularly related to the gang of horizontal saws. When the elevation of the mast 30 and boom 95 are correct for pruning operations, the periphery of the uppermost vertical saw slightly overlaps, that is extends above, the plane of the horizontal saws.

Although only the beam 50 and the mast 30 are specifically described as being controllable from the platform 86, it is to be clearly understood that the boom 95 and tilt control ram 151 could also be controlled from the platform. In such a case it would only be necessary to provide control rods, keys, levers, links and arms for the valves 151 and 164 connected and arranged similar to the elements numbered 170 through 179.

With all of the initial adjustments made and the pulley belt 198 tightened, the frame 10 is pulled or otherwise moved down the row of trees 250. Both the horizontal and the vertical saws 72 and 127 are rotatably driven by the engine 185 through the differential 195, the connecting rods 206 and 226, and the various pulley belts and sheaves 73 through 77 and 128 through 130. Preferably, the horizontal saws are rotated at approximately 1500 revolutions per minute whereas the vertical blades are rotated at approximately 3000 revolutions per minute. These speeds are not limiting but it is to be noted that the vertical saw speed is preferably approximately twice the horizontal saw speed. The saws engage the sides and top of the tree and cut it along two right-angularly related planes so that one side of each tree is "squared off." The apparataus is moved down one side of a row and up the other so that both sides of the trees are squared. Because the horizontal saws extend beyond the middle of the trees, two sweeps on opposite sides of the trees give them flat tops, and of course, flat sides.

The vertical saws 127 are preferebly forwardly tilted so that the failling limbs cut by the uppermost saws 127 do not drop onto the lower vertical saws and become entangled with them. If the cutting load on the saws 72 or 127 becomes so excessive that their preferred speed drops or they stop completely, it may be necessary to stop the apparatus and to back off the saws. This is done, for example, by turning the beam control rod 173 from the platform 86 by the key 179 to contract ram 58 and to swing the beam rearwardly. The beam is then oscillated back and forth to ease the saws through the troublesome limbs. This constitutes an important practical feature of the invention since otherwise the described movement would have to be attempted by moving the frame 10 back and forth, hardly an effective solution to the problem. The vertical saws can also be oscillated for the same purpose by the tilt control ram 151.

From the foregoing it will be evident that a highly versatile, easy-to-operate, mechanical pruning apparatus has been provided. Although some trees still need hand pruning particularly internal pruning, after being worked upon by the subject invention, the latter accomplishes a major portion of the task. In practice the apparatus has been found particularly useful, for example, on dormant deciduous and live citrous wood. The squared shape obtained has several advantages, namely, it provides a uniform shape particularly advantageous for pest control. The flattened tree sides in a row of trees may be compared to a smooth wall against which the insecticides can be sprayed from oscillating booms traveled between the rows. Further, by cutting off the exterior smaller limbs and branches, and leaving only larger limbs, it it found that the fruit size is larger. The cost of manually pruning close to the center of a tree to remove small limbs has been too high to be economically feasible. To illustrate how the present apparatus cuts pruning time and costs, it is now possible to prune five acres in two hours as compared with three days for the normal pruning crew.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A pruning apparatus comprising a frame mounted for earth traversing movement along a predetermined line of travel, a mast upwardly extended from the frame, a beam mounted on the mast and extended outwardly therefrom transversely of said line of travel, a gang of circular saws of substantially uniform diameter, means individually mounting the saws in the beam for rotation about substantially erect axes and locating the saws in a substantially common horizontal plane, the saws having centers of rotation positioned along a substantially straight line disposed longitudinally of the beam with the peripheries of adjacent saws in adjacent spaced relation, and powered means mounted on the frame and connected to the saws for imparting simultaneous rotation to the saws.

2. A pruning apparatus comprising a frame mounted for earth traversing movement along a predetermined line of travel, a mast upwardly extended from the frame, a substantially horizontal beam mounted on the mast for horizontal oscillating movement and laterally outwardly extended from said line of travel, means interconnecting the mast and the beam for oscillating the beam forwardly and rearwardly of a position substantially normal to said line of travel, a gang of circular saws of substantially uniform diameter rotatably mounted in the beam for rotation about substantially erect axes and located in a substantially common horizontal plane, the saws having centers of rotation positioned along a substantially straight line disposed longitudinally of the beam with the peripheries of adjacent saws in spaced relation, and powered means mounted on the frame and connected to the saws for imparting simultaneous rotation to the saws.

3. A pruning apparatus comprising a frame mounted for earth traversing movement along a predetermined line of travel, a mast upwardly extending from the frame, a substantially horizontal beam mounted on the mast for adjustable movement between a transporting position disposed longitudinally of said line of travel and an operating position transversely disposed to said line of travel, means interconnecting the beam and the mast for holding the beam in said operating position, a gang of circular saws of substantially uniform diameter rotatably mounted in the beam for rotation about substantially erect axes and located in a substantially common horizontal plane, the saws having centers of rotation positioned along a substantially straight line disposed longitudinally of the beam with the peripheries of adjacent saws in spaced relation, and powered means mounted on the frame and connected to the saws for imparting simultaneous rotation to the saws.

4. A pruning apparatus comprising a frame mounted for earth traversing movement along a predetermined line of travel, a telescopic, elevationally adjustable mast upwardly extended from the frame, powered means mounted on the frame and connected to the mast for raising and lowering the mast, a beam mounted on the mast and extended outwardly therefrom transversely of said line of travel, a gang of circular saws of substantially uniform diameter rotatably mounted in the beam for rotation about substantially erect axes and located in a substantially common horizontal plane, the saws having centers of rotation positioned along a substantially straight line disposed longitudinally of the beam with the peripheries of adjacent saws in adjacent spaced relation, and powered means mounted on the frame and connected to the saws for imparting simultaneous rotation to the saws.

5. A pruning apparatus comprising a frame mounted for earth traversing movement forwardly and rearwardly in a predetermined line of travel along a row of trees, a telescopic, hydraulically elevationally adjustable mast upwardly extended from the frame, a saw beam mounted on the mast for pivotal movement between a longitudinally extended transporting position and a pruning position extended outwardly of the frame transversely of said line of travel into tree engagement and being oscillatable in the pruning position, an hydraulic beam control ram interconnecting the mast and the beam for controllably oscillating the beam, a gang of circular saws of substantially uniform diameter rotatably mounted in the beam for rotation about substantially erect axes and being located in a substantially common horizontal plane, the saws having centers of rotation positioned along a substantially straight line disposed longitudinally of the beam with the peripheries of adjacent saws in adjacent spaced relation, and powered means mounted on the frame and connected to the saws for imparting simultaneous rotation to the saws, the control ram being adapted to swing the beam forwardly and rearwardly of its pruning position to accommodate the saws to the cutting load during engagement of the saws with the trees.

6. A pruning apparatus for simultaneously pruning the side and top of a tree comprising a frame mounted for earth traversing movement along a row of trees in a predetermined line of travel, a mast upwardly extended from the frame, a beam mounted on the mast and extended outwardly therefrom transversely of said line of travel, a gang of horizontal circular saws of substantially uniform diameter rotatably mounted in the beam for rotation about substantially erect axes and being located in a substantially common horizontal plane, the saws having centers of rotation located along a substantially straight line longitudinally of the beam with the peripheries of adjacent saws in adjacent spaced relation, a saw bar, means mounting the saw bar in a position upwardly extended from the frame adjacent to the mast, a gang of vertical circular saws of substantially uniform diameter rotatably mounted in the vertical saw beam for rotation about substantially horizontal axes and being located in a substantially common vertical plane, the vertical saws having centers of rotation positioned along a substantially straight line disposed longitudinally of the vertical saw beam with the peripheries of adjacent saws in adjacent spaced relation, the vertical and horizontal gangs of saws being overlapped so that the combined action of the saws provides pruned top and side tree surfaces meeting in a substantially sharp edge, and powered means mounted on the frame and connected to the horizontal and vertical saws for imparting simultaneous rotation to the saws.

7. A pruning apparatus for simultaneously pruning the side and top of a tree comprising a frame mounted for earth traversing movement along a row of trees in a predetermined line of travel, a mast upwardly extended from the frame, a beam mounted on the mast and extended outwardly therefrom transversely of said line of travel, a gang of horizontal circular saws of substantially uniform diameter rotatably mounted in the beam for rotation about substantially erect axes and being located in a substantially common horizontal plane, the saws having centers of rotation located along a substantially straight line longitudinally of the beam with the peripheries of adjacent saws in adjacent spaced relation, a saw bar, means mounting the saw bar in a position upwardly extended from the frame adjacent to the mast for forward and rearward pivotal movement about a substantially horizontal axis, powered means mounted on the frame and connected to the saw bar mounting means for pivoting said bar forwardly and rearwardly, a gang of vertical circular saws of substantially uniform diameter rotatably mounted in the vertical saw beam for rotation about substantially horizontal axes and being located in a substantially common vertical plane, the vertical saws having centers of rotation positioned along a substantially straight line disposed longitudinally of the vertical saw beam with the peripheries of adjacent saws in adjacent spaced relation, the vertical and horizontal gangs of saws being overlapped so that the combined action of the saws provides pruned top and side tree surfaces meeting in a substantially sharp edge, and powered means mounted on the frame and connected to the horizontal and vertical saws for imparting simultaneous rotation to the saws.

8. A pruning apparatus comprising a frame mounted for earth traversing movement along a predetermined line of travel; a mast upwardly extended from the frame; a beam mounted on the mast and extended outwardly therefrom transversely of said line of travel; a gang of circular saws of substantially uniform diameter rotatably mounted in the beam for rotation about substantially erect axes and being located in a substantially common horizontal plane, the saws having centers of rotation positioned along a substantially straight line disposed longitudinally of the beam with the peripheries of adjacent saws in adjacent spaced relation; an operator's platform; means mounting the platform adjacent to the upper end of the mast above the plane of the saws; powered means mounted on the frame and connected to the saws for imparting simultaneous rotation to the saws; and a control rod mounted in the frame, extended upwardly adjacent to the operator's platform, and connected to the powered means for enabling control of the powered means at the operator's platform.

9. A pruning apparatus for trimming the tops of trees arranged in rows in an orchard so that said tree tops are substantially flattened comprising a support frame, means mounting the frame for earth traversing movement forwardly and rearwardly along a predetermined line of travel adjacent to a row of trees, an erect, telescopically adjustable mast including a lower portion mounted on the frame and an upper portion upwardly and downwardly extendible and retractible relative to the lower portion, vertically spaced hinge plates extended from the upper portion of the mast laterally of said line of travel, an erect pivot pin rotatably journaled in the hinge plates, a bushing fitted between the hinge plates around the pin, an elongated substantially horizontal saw beam having an outer end and an inner end rotatably journaled on the bushing for movement of the saw beam between a transporting position in substantial longitudinal alignment with said line of travel and a pruning position outwardly extended from the frame transversely of said line of travel and in tree engagement, a plurality of substantially erect shafts journaled in the saw beam in longitudinally spaced relation and lying along a substantially straight line disposed longitudinally of the beam, circular saws of uniform diameter individually secured to the shafts below the beam for rotation in a substantially common horizontal plane to cut the tops of trees engaged thereby, driven sheaves individually secured to the shafts, drive sheaves individually secured to the shafts except the outermost shaft and to the connecting pin, pulley belts connecting drive and driven sheaves of adjacent shafts and the sheave on the connecting pin to the driven sheave of the innermost shaft, power means mounted on the frame having an upwardly disposed rotary output shaft below the connecting pin, an elongated rotatable telescopically adjustable connecting rod having upper and lower ends universally connected to the connecting pin and to the output shaft of the power means for imparting rotation to the saws, and an hydraulic beam control ram interconnecting the upper portion of the mast and the saw beam for swinging the beam slightly forwardly and rearwardly in said pruning position to accommodate the saws to their cutting load.

References Cited in the file of this patent

UNITED STATES PATENTS

| | | |
|---|---|---|
| 40,235 | Bolmer | Oct. 13, 1863 |
| 1,397,365 | Cook | Nov. 15, 1921 |
| 1,645,924 | Palmigiano | Oct. 18, 1927 |
| 1,710,749 | Svendsgaard | Apr. 30, 1929 |
| 1,875,561 | Cirrito | Sept. 6, 1932 |
| 2,299,129 | Dickenson et al. | Oct. 20, 1942 |
| 2,354,625 | Van Sickle | July 25, 1944 |
| 2,365,408 | Hillyer | Dec. 19, 1944 |
| 2,564,032 | Roberton | Aug. 14, 1951 |
| 2,630,628 | Hall | Mar. 10, 1953 |
| 2,633,636 | Szostek | Apr. 7, 1953 |
| 2,777,483 | Cherem | Jan. 15, 1957 |

FOREIGN PATENTS

| | | |
|---|---|---|
| 170,948 | Germany | May 26, 1906 |

OTHER REFERENCES

Popular Mechanics Magazine, February 1931, page 162.